United States Patent
Moon et al.

(10) Patent No.: US 8,984,002 B2
(45) Date of Patent: Mar. 17, 2015

(54) QUERY BUILDER SYSTEM FOR RESOURCE DESCRIPTION FRAMEWORK BASED KNOWLEDGE STORES

(75) Inventors: John T. Moon, St. Petersburg, FL (US); Jean E. Greenawalt, Palm Harbor, FL (US); William H. Barker, Pinellas Park, FL (US)

(73) Assignee: Raytheon Company, Waltham, MA (US)

( * ) Notice: Subject to any disclaimer, the term of this patent is extended or adjusted under 35 U.S.C. 154(b) by 830 days.

(21) Appl. No.: 13/100,079

(22) Filed: May 3, 2011

(65) Prior Publication Data

US 2011/0276588 A1 Nov. 10, 2011

Related U.S. Application Data

(60) Provisional application No. 61/331,288, filed on May 4, 2010.

(51) Int. Cl.
*G06F 17/30* (2006.01)

(52) U.S. Cl.
CPC .... *G06F 17/30973* (2013.01); *G06F 17/30926* (2013.10)
USPC .......................................................... 707/769

(58) Field of Classification Search
CPC ..................... G06F 17/30973; G06F 17/30926
USPC .......................................................... 707/769
See application file for complete search history.

(56) References Cited

U.S. PATENT DOCUMENTS

2009/0077094 A1* 3/2009 Bodain ........................... 707/10
2009/0282068 A1* 11/2009 Shockro et al. ................ 707/101
2010/0070517 A1* 3/2010 Ghosh et al. ................... 707/758

OTHER PUBLICATIONS w3.org, Weaving the Web—Berners-Lee, "Glossary", http://www.w3.org/People/Berners-Lee/Weaving/glossary.html (14 pgs), last modified Jul. 23, 1999.
Wikipedia, "File: Semantic-web-stack.png", http://en.wikipedia.org/wiki/File:Semantic-web-stack.png (1 pg), printed Nov. 29, 2011.
Wikipedia, "Ontology (information science)", http://en.wikipedia.org/wiki/Ontology_(information_science) (11 pgs), Printed: Nov. 29, 2011.
w3.org, From Semantic Web Standards, "Resource Description Framework (RDF)", http://www.w3.org/2001/sw/wiki/RDF (3 pgs), Feb. 10, 2004.
w3.org, "RDF Vocabulary Description Language 1.0: RDF Schema", http://www.w3.org/TR/rdf-schema/ (24 pgs), Feb. 10, 2004.

(Continued)

*Primary Examiner* — Huawen Peng
(74) *Attorney, Agent, or Firm* — Schwegman Lundberg & Woessner, P.A.

(57) ABSTRACT

According to one embodiment, a computer-implemented method, includes accessing, by a computer system, a knowledge store that stores records structured according to a RDF specification. The method also includes, based on a drag-and-drop selection technique, receiving a first entry in a first query entry field. The first entry is selected from a group comprising one or more of the following: a first class of a plurality of classes, a first predicate of a plurality of predicates, a first instance of a plurality of instances, and a first text entry of a plurality of text entries. The method further includes generating a SPARQL query using at least the first entry. The method further includes transmitting the generated SPARQL query to the knowledge store.

18 Claims, 10 Drawing Sheets

(56) References Cited

OTHER PUBLICATIONS w3,org, "OWL 2 Web Ontology Language Document Overview", http://www.w3.org/TR/owl2-overview/ (11 pgs), Oct. 27, 2009.
w3.org, "OWL Web Ontology Language Overview—W3C Recommendation", http://www.w3.org/TR.owl-features/ (18 pgs), Feb. 10, 2004.
w3.org, "SPARQL Protocol for RDF—W3C Recommendation", http://www.w3.org/TR/rdf-sparql-protocol/ (29 pgs), Jan. 15, 2008.
Semanticweb.org, "SPROT", http://semanticweb.org/wiki/SPROT (1 pg), Last modified May 21, 2008.
Wikipedia, "Swing (Java)", http://en.wikipedia.org/wiki/Swing_(Java) (8 pgs), Printed: Nov. 29, 2011.
w3.org, "SPARQL Query Language for RDF—W3C Recommendation", http://www.w3.org/TR/rdf-sparql-query/ (105 pgs), Jan. 15, 2008.
http://www.ontotext.com/owlim/index.html, last visited Nov. 30, 2011.
http://www.openrdf.org/, last visited Nov. 30, 2011.
http://tomcat.apache.org/, last visited Nov. 30, 2011.
http://www.adobe.com/products/flex/, last visted, Nov. 30, 2011.
Topbraid Composer, http://www.topquadrant.com/products/TB_Composer.html, last visited Nov. 30, 2011.

* cited by examiner

Kx Portal v1.03 ALPHA

| Keyword Search | Build Query | Assert / Delete Facts | Data Sources |

Classes

- Countries : Country
- Aviation : Aircraft
- Aviation : AircraftTypeDescription
- Aviation : AircraftWeightCategory
- Aviation : Airport
- Aviation : FlightPlan
- Aviation : FlightPlanHistory
- lr_countrycodes : Country

50

[Add]

Basket

- ?o
- ?p
- ?s
- Aviation : AircraftTypeDescription
- Aviation : Aircraft_N11BV
- Aviation : FlightPlanHistory
- lr_countrycodes : Country
- aviation : Aircraft_N11BV

54

[Delete]

58 Keyword: [____] 62

☐ Search Instance ID  ☑ Search Description

60 [Search] Max

| Instance ID | Description |
|---|---|
| aviation : Aircraft_N4363Q | Aircraft_N4363Q |
| aviation : Aircraft_N442P | Aircraft_N442P |
| aviation : Aircraft_N442PA | Aircraft_N442PA |
| aviation : Aircraft_N442PC | Aircraft_N442PC |
| aviation : Aircraft_N442PD | Aircraft_N442PD |
| aviation : Aircraft_N442PG | Aircraft_N442PG |
| aviation : Aircraft_N442PM | Aircraft_N442PM |
| aviation : Aircraft_N442PR | Aircraft_N442PR |

Rows Returned: 99

| Edit Filters | Query View | Graph View | Saved Queries | Select Results | Construct Results |

| Name | QueryType | RunAsRule |
|---|---|---|
| BCS_RULE_1 | CONSTRUCT | false |
| IOEC_RULE | CONSTRUCT | false |
| Iraq_WatchList | SELECT | false |
| New_test_7 | SELECT | true |
| Select_1 | SELECT | false |
| rule_2 | CONSTRUCT | true |
| rule_3 | CONSTRUCT | false |
| test777 | SELECT | false |
| test_query | SELECT | false |

[ Load ] [ Delete ]

*FIG. 6*

| p | o | p_label | o_label |
|---|---|---|---|
| rdf : type | owl : Thing | | |
| rdf : type | aviation : Aircraft | | Aircraft |
| rdfs : label | Aircraft N11BV | | |
| aviation : isOwnedBy | sim_laptop : Company_1 | is owned by | YUZANA COMPANY LIMITED |
| aviation : isOwnedBy | aviation : NEREID_LLC | is owned by | NEREID LLC |
| aviation : hasAircraftTypeDescription | aviation : AircraftTypeDecsription_273017 | has aircraft type description | 2730170 |
| aviation : hasSerialNumber | 21 | has serial number | |
| aviation : hasTailNumber | N11BV | has tail number | |
| aviation : hasModeCode | V | has mode code | |
| aviation : hasYearBuilt | 1995 | has year built | |
| aviation : hasPart | aviation : Engine_2730170_02500_1995 | has part | |

Rows Returned: 12

*FIG. 7*

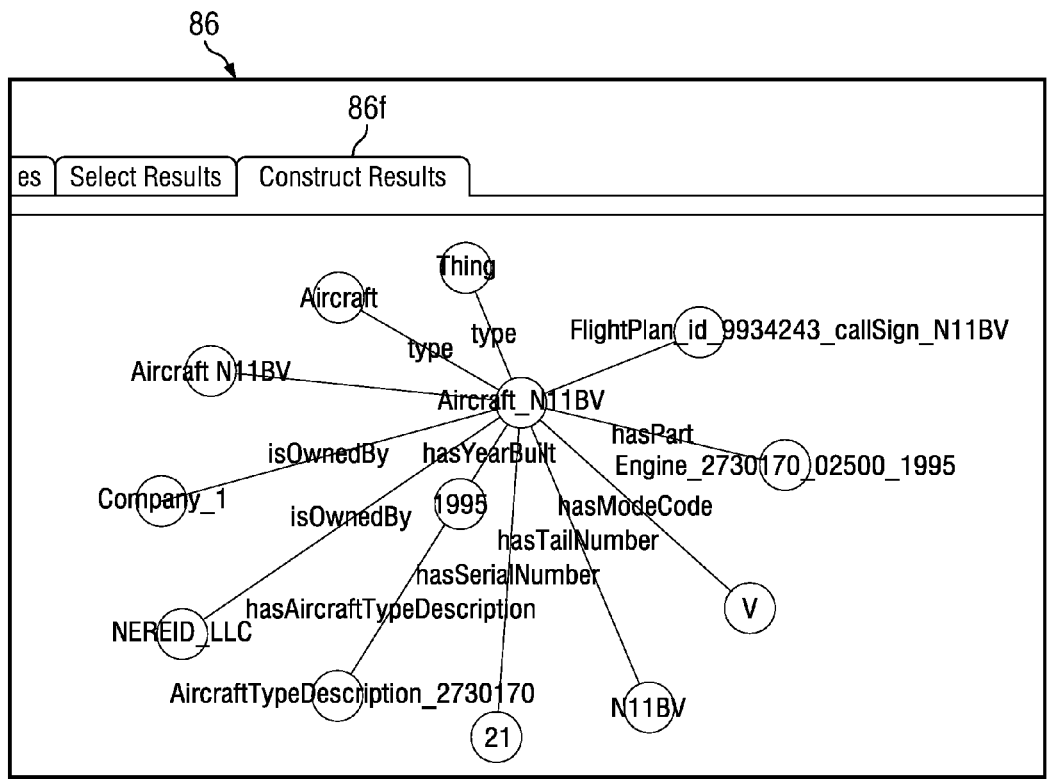

*FIG. 8*

Simple XML Example:

```
<query label="Query" optionalCount="1" unionCount="1" type="SELECT" showLabels="true"
 runAsRule="false" limit="0">
 <union label="CONSTRUCT" useCustomConstruct="false">
  <filters label="graph" isBranch="false"/>
 </union>
 <union label="SELECT" useCustomSelect="false">
  <filters label="result" isBranch="false"/>
 </union>
 <union label="BASE">
  <filters label="filters" isBranch="false">
   <filter label="filter" sub="Aviation:Aircraft_N11BV" obj="?o" pred="?p"/>
   <filter label="filter" filter="FILTER(?P != "Aircraft_N1131")"/>
  </filters>
 </union>
 <prefixString>
  <![CDATA[PREFIX afn: <http://jena.hpl.hp.com/ARQ/function#>
      PREFIX person: <http://www.kmet.com/stp/person/>
      PREFIX country_data: <http://www.kmet.com/stp/country_data/>
  ]]>
 </prefixString>
</query>
```

QUERY BUILDER SYSTEM FOR RESOURCE DESCRIPTION FRAMEWORK BASED KNOWLEDGE STORES

RELATED APPLICATIONS

This application claims the benefit under 35 U.S.C. §119(e) of the priority of U.S. Provisional Application Ser. No. 61/331,288, filed May 4, 2010, entitled "Query Builder System For Resource Description Framework Based Knowledge Stores."

BACKGROUND

The resource description framework (RDF) is a specification that applies conceptual modeling techniques to provide a structure for data in which its elements may be linked with one another according to their relationship. Such data structures may provide enhanced utility by improving search capabilities and/or developing a context from which to infer other aspects of information that may not be included in the data while in its raw form. RDF databases have been developed that store data according to the RDF specification. Access to data from these databases is provided by a RDF query language commonly referred to as the SPARQL Protocol and RDF Query Language (SPARQL) query language.

BRIEF DESCRIPTION OF THE DRAWINGS

A more complete understanding of embodiments of the disclosure will be apparent from the detailed description taken in conjunction with the accompanying drawings in which:

FIG. 2 illustrates one embodiment of a keyword search window that may be displayed;

FIG. 6 illustrates one embodiment of the output window portion that may displayed in response to actuation of the saved queries tab;

FIG. 7 illustrates one embodiment of the output window portion that may be displayed in response to actuation of the select results tab;

FIG. 8 illustrates one embodiment of the output window portion that may be displayed in response to actuation of the construct view tab;

FIG. 10 illustrates one example portion of a SPARQL query that has been generated.

DETAILED DESCRIPTION OF EXAMPLE EMBODIMENTS

Application software written to access data from Resource Description Framework (RDF) based knowledge stores typically includes software code capable of processing queries written according to the SPARQL query language. The SPARQL query language, however, is generally cryptic in nature such that manual generation of queries is often difficult to perform. Certain embodiments of the present disclosure include a query building engine 34 that may provide a solution to this problem by using a drag-and-drop selection technique in order to generate SPARQL queries. This may allow generation of SPARQL queries without requiring the user to know or understand SPARQL, and may further allow generation of SPARQL queries that may be free of (or have a reduced number of) errors due to namespace conflicts or miss-spelling of terms. Furthermore, in certain embodiments, RDF-based knowledge stores organize elements of records in one a plurality of classes, instances, and predicates. This class, instance, and predicate structure may be used by query building engine 34 to present relevant information about stored records, so as to provide enhanced generation of SPARQL queries for use with RDF-based knowledge stores.

Figure 1:
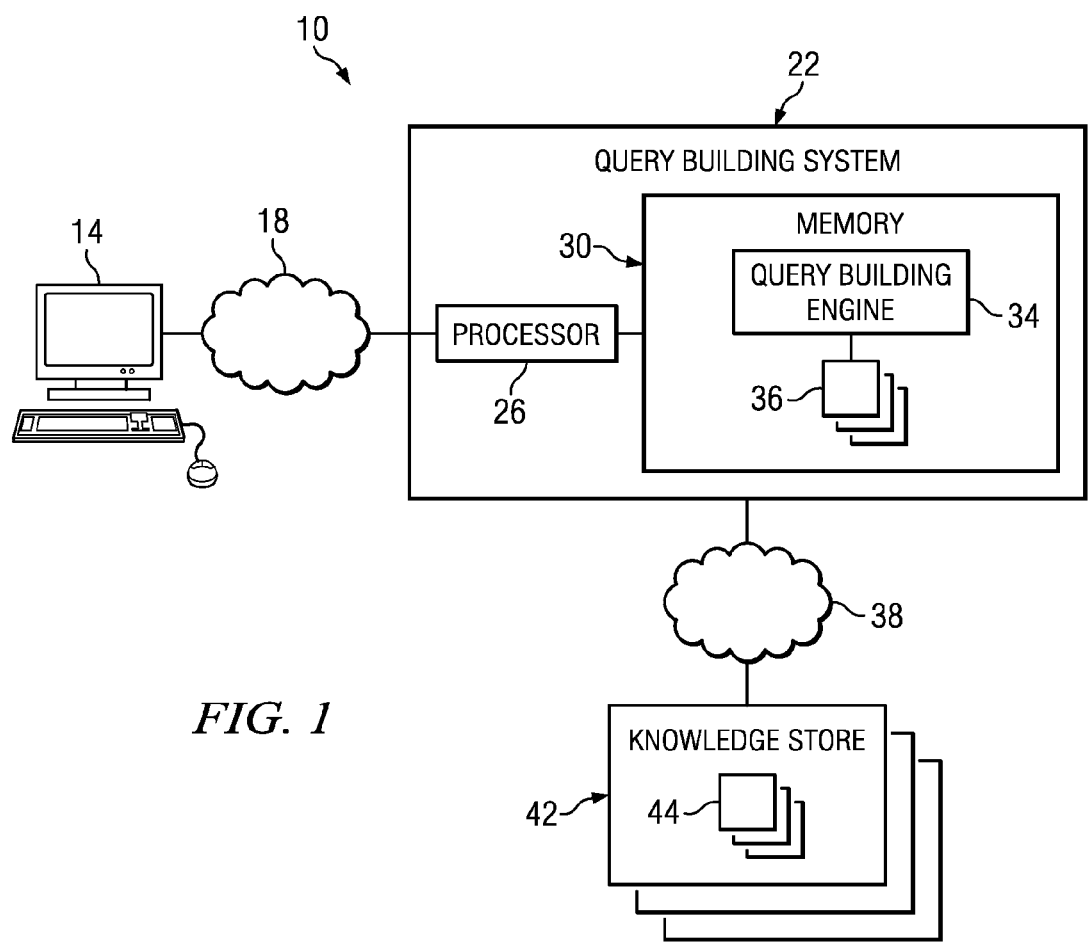
FIG. 1 illustrates one embodiment of a system for building queries according to the teachings of the present disclosure.

FIG. 1 illustrates one embodiment of a system 10 for building queries according to the teachings of the present disclosure. System 10 includes a user computer 14, a network 18, a query building system 22, a query building engine 34, a network 38, and one or more knowledge stores 42. Although this particular implementation of system 10 is illustrated as primarily described, the present disclosure contemplates system 10 including any suitable components, according to particular needs.

User computer 14 may be implemented using any suitable type of processing system and may include any suitable combination of hardware, firmware, and software. For example, user computer 14 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, personal data assistant (PDA), one or more Internet Protocol (IP) telephones, smart phones, table computers, one or more servers, a server pool, one or more processors within these or other devices, or any other suitable processing device. User computer 14 may be a stand-alone computer or may be a part of a larger network of computers associated with an entity.

User computer 14 may provide a user access to the query building engine 34 executed on query building system 22. In particular embodiments, the user of user computer 14 may access query building engine 34 through any suitable method. For example, the user may access query building engine 34 through a web browser by typing in its uniform resource locator (URL) and/or IP address and logging in. In a further embodiment, query building engine 34 may be automatically accessed by user computer 14 upon activating a web browser.

User computer 14 may display information associated with query building engine 34 and/or data generated by query building engine 34. For example, user computer 14 may include a display, such as a liquid crystal display (LCD) (or any other type of a display) for displaying such data. In particular embodiments, the display may display a graphical user interface (GUI) that displays information associated with query building engine 34 or data generated by query building engine 34. Additionally, user computer 14 may include one or more input devices, such as a keyword, a mouse, a console button, or other device for receiving input from the user of user computer 14.

User computer 14 may be communicatively coupled to query building system 22 via network 18. Network 18 facilitates wireless or wireline communication, and may communicate, for example, IP packets, Frame Relay frames, Asynchronous Transfer Mode (ATM) cells, voice, video, data, and other suitable information between network addresses. Network 18 may include one or more local area networks (LANs), radio access networks (RANs), metropolitan area networks (MANs), wide area networks (WANs), mobile networks (e.g., using WiMax (802.16), WiFi (802.11), 3G, 4G, or any other suitable wireless technologies in any suitable combination), all or a portion of the global computer network known as the Internet, and/or any other communication system or systems at one or more locations, any of which may be any suitable combination of wireless and wireline.

Query building system 22 may be implemented using any suitable type of processing system and may include any suitable combination of hardware, firmware, and software. For example, query building system 22 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, smart phones, table computers, one or more servers, a server pool, one or more processors within these or other devices, or any other suitable processing device. Query building system 22 may be a stand-alone computer or may be a part of a larger network of computers associated with an entity.

As illustrated, query building system 22 includes query building engine 34 that is stored in a memory 30 and executed on a processor 26. Processor 26 may include one or more microprocessors, controllers, or any other suitable computing devices or resources. Processor 26 may work, either alone or with other components of system 10, to provide a portion or all of the functionality of system 10 described herein. Memory 30 may take the form of any suitable combination of volatile and non-volatile memory including, without limitation, magnetic media, optical media, random-access memory (RAM), read-only memory (ROM), removable media, and any other suitable memory component.

Query building engine 34 may include any suitable computer program, software, computer executable instructions, logic and/or instructions capable of being executed by query building system 22 in order to generate SPARQL Protocol and RDF Query Language (SPARQL) queries (such as SPARQL queries 36 illustrated in FIG. 1). In particular embodiments, query building engine 34 may be contained within a medium, such as a tangible medium.

As is discussed below with regard to FIGS. 2-11, query building engine 34 may assemble SPARQL queries according to user input, and may further communicate these generated SPARQL queries to knowledge store 42. Query building engine 34 may further receive results of the SPARQL query communicated to knowledge store 42, format the results in any suitable format, and communicate the results to user computer 14 for display to the user. Query building engine 34 may further access knowledge store 42 in order to provide any other suitable information to the user of user computer 14. For example, as is discussed below, query building engine 34 may access knowledge store 42 in order to retrieve information associated with classes and predicates for display to the user.

Query building system 22 may be communicatively coupled to knowledge store 42 via network 38. Network 38 facilitates wireless or wireline communication, and may communicate, for example, IP packets, Frame Relay frames, ATM cells, voice, video, data, and other suitable information between network addresses. Network 38 may include one or more LANs, RANs, MANs, WANs, mobile networks (e.g., using WiMax (802.16), WiFi (802.11), 3G, 4G, or any other suitable wireless technologies in any suitable combination), all or a portion of the global computer network known as the Internet, and/or any other communication system or systems at one or more locations, any of which may be any suitable combination of wireless and wireline. Query building system 22 may communicate with knowledge store 42 through network 38 according to any suitable protocol. For example, query building system 22 may communicate with knowledge store 42 through network 38 according to SPARQL endpoint using Hypertext Transfer Protocol (HTTP). Although FIG. 1 illustrates network 38 and network 18 as separate networks, in particular embodiments, network 38 and network 18 may be the same network.

Knowledge store 42 may be implemented using any suitable type of processing system and may include any suitable combination of hardware, firmware, and software. For example, knowledge store 42 may include one or more computer systems at one or more locations. Each computer system may include any appropriate input devices, output devices, mass storage media, processors, memory, or other suitable components for receiving, processing, storing, and communicating data. For example, each computer system may include a personal computer, workstation, network computer, kiosk, wireless data port, PDA, one or more IP telephones, smart phones, table computers, one or more servers, a server pool, one or more databases, one or more processors within these or other devices, or any other suitable processing device. Knowledge store 42 may be a stand-alone computer or may be a part of a larger network of computers associated with an entity. In particular embodiments, knowledge store 42 may be a BigOWLIM server implementing SESAME RDF Application Programming Interface (API).

In particular embodiment, knowledge store 42 may take the form of volatile or non-volatile memory including, without limitation, magnetic media, optical media, RAM, ROM, removable media, or any other suitable memory component. In certain embodiments, a portion of all of knowledge store 42 may include a database, such as one or more RDF-based servers or relational databases.

Knowledge store 42 may store data as records 44 in a subject-predicate-object ontological model according to the RDF specification. Data structured according to the subject-predicate-object ontological model may be referred to as "triples." As an example, a raw data element comprising "John has a convertible automobile" may be stored as a triple including "John" as the subject, "has" as the predicate (or property), and "convertible automobile" as the object. In a further embodiment, the RDF-based data stored in knowledge store 42 also may be based on any other suitable standards and/or specifications, such as RDF schema (RDFS) and/or Web Ontology Language (OWL). For example, RDFS and OWL may build upon the RDF-based data by adding additional vocabulary (such as additional classes, predicates, and axioms) to enable reasoning. As a particular example, the axioms added by RDFS and OWL may enable the inference of additional triples to the knowledge store 42. The "inverse of" relationship is an example of an axiom. In particular, a raw data element comprising "X is capable of Y" may have an inverse inferred relationship comprising "Y is a capability for X." Since the axiom provides this inverse, the inverse does not have to be actually loaded into knowledge store 42. Instead, adding the axiom to the knowledge store 42 causes the inverse to be created and stored in knowledge store 42. The axioms provide additional triples to be stored in knowledge store 42.

RDF-based data stored in knowledge store 42 may be input into knowledge store 42 using any suitable method. For example, the data may be loaded into knowledge store 42 using one or more T-Box (or term box) OWL files and A-Box (or assertions box) RDF files. In one embodiment, the RDF-based data may be loaded into knowledge store 42 by an administrator that manages knowledge store 42.

The RDF-based data stored in knowledge store 42 may be stored in any suitable organizational structure. For example, the subjects and objects of the triples stored in knowledge stores 42 may be stored as instances of "classes." The classes may include abstract representations of the subjects and objects. For example, a particular class referred to as "vehicles" may include automobiles, boats, and/or aircraft as subjects and/or objects. In such an example, a search for the members of the class "vehicles" may return results that include each of these subjects and/or objects. In particular embodiments, each class (and/or each subject and/or object) may be a Universal Resource Identifier (URI) that identifies a data element in knowledge store 42. Additionally or alternatively, in particular embodiments, each class (and/or each subject and/or object) may be a literal string that identifies a data element in knowledge store 42.

As described above, the subjects and objects of the triples stored in knowledge stores 42 may be stored as instances of "classes." In particular embodiments, an instance of a class may refer to a member of the class (such as URI data stored in knowledge store 42 under a particular class). For example, knowledge store 42 may store the instance "Aircraft_N4363Q," as a subject and/or an object of the class "Aviation:Aircraft." If a user queries knowledge store 42 for the class "Aviation:Aircraft," the returned results may include all of the instances of the class, such as instance "Aircraft_N4363Q."

The predicates of the triples stored in knowledge store 42 may be stored as "predicates." A predicate of a triple stored in knowledge store 42 may define the relationship from the data element of the subject's URI to the data element of the object's URI. In particular embodiments, each predicate may also be a URI that identifies a data element in knowledge store 42. Additionally or alternatively, in particular embodiments, each predicate may also be a literal string that identifies a data element in knowledge store 42. The predicate URI of the RDF triple may define the relationship or literal string. A search for the predicate "capable of" may retrieve results that match the "capable of" predicate.

In addition to storing the RDF-based data, knowledge store 42 may further receive SPARQL queries and process the SPARQL queries in order to provide results (of the SPARQL query) to query building engine 34. In such an embodiment, the knowledge store 42 may include any suitable logic or programming for processing the queries and providing the data as results. In a further embodiment, knowledge store 42 may further develop additional RDF-based data. For example, based on data input into knowledge store 42, knowledge store 42 may create inferences of the input data, thus creating additional triples stored at knowledge store 42. In such an example, knowledge store 42 may include any suitable logic or programming for creating the additional RDF-based data.

As is illustrated in FIG. 1, knowledge store 42 may refer to more than one knowledge store 42. In one embodiment, query building engine 34 may be simultaneously connected to more than one of these knowledge stores 42. In such an embodiment, a SPARQL query may be sent to each of these knowledge stores 42, and results may be returned from each of these knowledge stores 42. In one embodiment, query building engine 34 may connect to a particular knowledge store 42 using any suitable method. For example, query building engine 34 may connect to a knowledge store 42 by a user entering the HTTP address of the knowledge store 42 in a browser's URL window. In certain embodiments, the HTTP addresses of the knowledge stores 42 (and any other setup information) may be saved by query building engine 34. As such, future query sessions with knowledge stores 42 may be conducted without re-entering the relevant addresses of these knowledge stores 42 (or any other setup information).

Modifications, additions, or omissions may be made to system 10 without departing from the scope of disclosure. The components of system 10 may be integrated or separated. For example, user computer 14 and query building system 22 may be the same computer system. As such, user computer 14 may store query building engine 34 in memory and execute query building engine 34 on a processor, allowing the SPARQL queries to be generated at user computer 14, and further allowing the generated SPARQL queries to be transmitted by user computer 14 to knowledge store 42. As a further example, each of user computer 14, query building system 22, and/or knowledge store 42 may be any other suitable combination of computer systems (such as one or more computer systems). Moreover, the operations of system 10 may be performed by more, fewer, or other components. For example, system 10 may include other services or features that manipulate textural input for generation of SPARQL queries.

FIG. 2 illustrates a keyword search window 46 that may be displayed by query building engine 34 of FIG. 1 on user computer 14 of FIG. 1. According to the illustrated embodiment, keyword search window 46 includes a class window portion 50, a basket window portion 54, and a results window portion 58. Class window portion 50 displays a list of one or more classes. The classes displayed in class window portion 50 may have member instances that include one or more subjects and/or objects included in triples stored in the knowledge store 42. For example, the class "Aviation:Aircraft" may have a member instance "Aircraft_N4363Q," as a subject and/or an object of triples stored in the knowledge store 42. In one embodiment, the classes displayed in class window portion 50 may be populated from the data stored in knowledge store 42. For example, query building engine 34 may access knowledge store 42 in order to retrieve all (or a portion) of the classes associated with the triples stored in the knowledge store 42. As another example, all (or a portion) of the classes may be generated by the query building engine 34 (or by any other suitable program or system) based on the triples in knowledge store 42. These classes may be displayed to a user.

Basket window portion 54 displays a list of one or more elements (such as a class, instance, predicate, and/or text entry) that have been previously used, selected, searched, and/or displayed by query building engine 34. For example, a particular class that is selected from class window portion 50 during a previous search may be stored for display in the basket window portion 54. As such, basket window portion 54 may display elements that have been used by a user in a previous search, and that are likely to be used again by the user for a subsequent search. In addition to classes, basket window portion 54 may also display instances, predicates, and/or text entries. A text entry may refer to any suitable textual element, variable, or value that may be used in a search or query. For example, a text entry may be a variable in the form of "?" followed by a user-defined variable name. This text entry may represents the variable to bind query results to.

A search or query using a class such as "Aviation:Aircraft" and the variable text entry "?s" may return results that include all of the instance data stored in knowledge store 42 that are members of the class "Aviation:Aircraft." Thus, the text entry may refer to the unknown data that the user is searching for.

In one embodiment, keyword search window 46 may allow a SPARQL query to be generated. For example, in order to generate a SPARQL query, a class, an instance, a predicate, or a text entry may be selected from either class window portion 50 or basket window portion 54, and a search button 60 may be actuated. In response, query building engine 34 may generate a SPARQL query using the selected class, instance, predicate, and/or text entry. Furthermore, query building engine 34 may further transmit the generated SPARQL query to knowledge store 42. When the results are transmitted back to query building engine 34 from knowledge store 42, one or more results associated with the selection may be displayed in results window portion 58 for view by a user. In the particular example shown, results window portion 58 displays a number of results that are stored in knowledge store 42 under the example class "Aviation:Aircraft." In particular embodiments, once the results are displayed in results window portion 58, one or more of the results may be selected, resulting in a further display of the entire record associated with the selected result.

In one embodiment of keyword search window 22, query building engine 34 may generate a SPARQL query using the selected class. For example, the SPARQL query may be generated using the selection provided by a user, and also using, as an example, an automatic selection of the predicate "type." When the "Aviation:Aircraft" class is selected, a SPARQL may be generated that returns instances that are members of the "Aviation:Aircraft" class. Accordingly, the returned results displayed in results window portion 58 may include only types of aviation aircraft.

Keyword search window 46 further includes a keyword entry portion 64. A user may type in a particular text entry, and a SPARQL query may be generated using the typed in entry. This may allow a user to search for URIs or literal strings that are not displayed in class window portion 50 or basket window portion 54.

Figure 3:
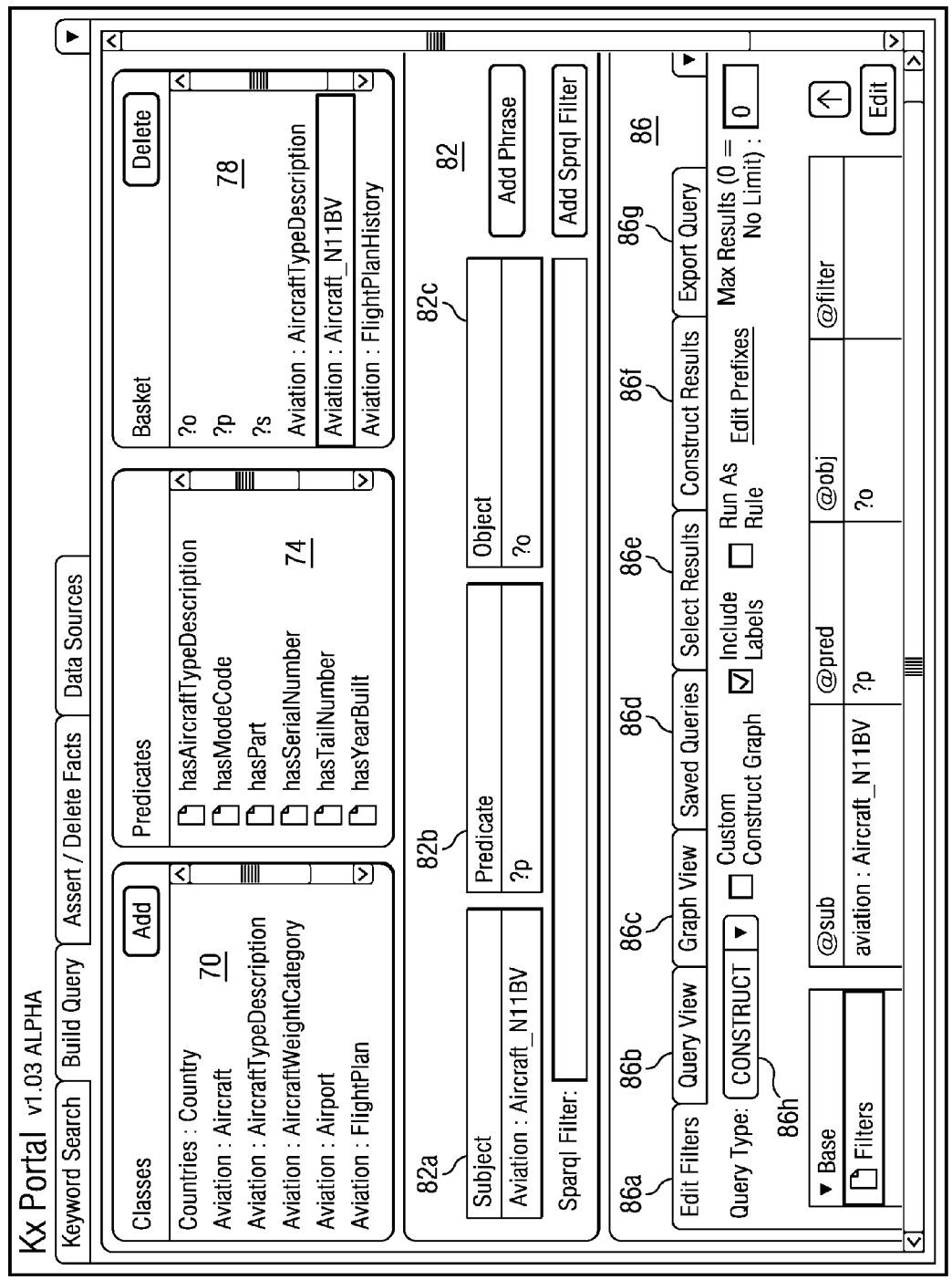
FIG. 3 illustrates one embodiment of a query building window that may be displayed.

FIG. 3 illustrates one embodiment of a query building window 66 that may be displayed by query building engine 34 of FIG. 1 at user computer 14. According to the illustrated embodiment, query building window 66 includes a class window portion 70, a predicate window portion 74, a basket window portion 78, a query entry field 82, and an output window portion 86. According to one embodiment, class window portion 70 of FIG. 3 is substantially similar to class window portion 50 of FIG. 2, and basket window portion 78 of FIG. 3 is substantially similar to basket window portion 54 of FIG. 2.

Predicate window portion 74 displays a list of predicates that are included in triples stored in the knowledge store 42. In one embodiment, the predicates displayed in predicate window portion 74 may be populated from the data stored in knowledge store 42. For example, query building engine 34 may access knowledge store 42 in order to retrieve all (or a portion) of the predicates included in triples in the knowledge store 42. These predicates may be displayed to a user.

Query entry field 82 provides a user with one or more entry fields to populate (or provide an entry for) in order to generate a SPARQL query. Query entry field 82 includes a subject entry field 82a, a predicate entry field 82b, and an object entry field 82c. In one embodiment, subject entry field 82a and object entry field 82c may be populated with classes listed in class window portion 70, classes listed in basket window portion 78, instances listed in basket window portion 78, or text entries listed in basket window portion 78. As such, both subject entry field 82a and object entry field 82c may be populated with either a class (such as "Aviation:Aircraft"), an instance (such as "Aviation:Aircraft_N11BV"), or a text entry (such as "?o"). Predicate entry field 82b may be populated with predicates listed in predicate window portion 74, predicates listed in basket window portion 78, or text entries listed in basket window portion 78. As such, predicate entry field 82b may be populated with either a predicate (such as "has aircraft-type description") or a text entry (such as "?b").

Subject entry field 82a, predicate entry field 82b, and/or object entry field 82c may be populated using a drag-and-drop selection technique. The drag-and-drop selection technique generally refers to a type of selection technique in which a selectable entry (such as a class, instance, predicate, or text entry) displayed in a first portion of a window (such as class window portion 70, predicate window portion 74, and/or basket window portion 78) is selected; the selected entry is dragged to a second portion of the window (such as subject entry field 82a, predicate entry field 82b and/or object entry field 82c); and the selected entry is dropped into the second portion of the window. In one embodiment, this drag-and-drop selection technique may cause the selected entry to be received at the second portion, and may further cause the second portion to be populated by the selected entry. In one embodiment, the drag-and-drop selection technique may be performed by a user using a "dragging" motion with a mouse coupled to user computer 14.

Although the drag-and-drop selection technique has been described as dragging and dropping a selected entry from a first portion of a window to a second portion of a window, in particular embodiments, the drop-and-drag technique may include dragging and dropping selected entries from a first window to a second window. For example, the selected entry may be listed in an entirely different window than the window to which the selected entry is dragged and dropped. In one embodiment, this may allow a user to have multiple windows open, and further allow the user to drag-and-drop entries from one window to the next.

Certain embodiments incorporating the drag-and-drop selection technique may provide advantages in that subject entry field 82a, predicate entry field 82b, and object entry field 82c may be populated with classes, predicates, and/or text entries in a relatively easy and ergonomic manner. In particular embodiments, this may reduce the amount of typing that the user has to do and may eliminate some typing errors.

In certain embodiments, query entry field 82 may allow a user to build a SPARQL query by incrementally building the triple statements that make up the query. For example the user can use the drag-and-drop selection technique to incrementally populate each of the subject entry field 82a, the predicate entry field 82b, and the object entry field 82c.

Query entry field 82 displays the elements of the query as the query is being built. Furthermore, query entry field 82 further allows a user to select and edit individual elements. For example, once one of the entry fields (such as subject entry field 82a) is populated, the user may select the entry populating the entry field, and may edit the entry. For example, if the subject entry field 82a is populated with the instance "Aviation:Aircraft_N11BV," the user may select this instance in subject entry field 82a and edit it. This may allow the user to modify the entered instance to be a different instance. For example, in one embodiment, basket window portion 78 may not include a particular instance that the user may want to include in a SPARQL query. As such, the user may drag-and-drop an instance that is textually similar to the particular instance that the user wants. After the instance has been dragged and dropped into the subject entry field 82a, the user may then edit the instance to be the particular instance that the user wanted originally. For example, the instance "Aviation:Aircraft_N11BV" may be edited to be "Aviation: Aircraft_N442PN."

Query entry field 82 may further allow the user to add a SPARQL filter to a SPARQL query. For example, the user may want to filter results of the SPARQL query to include only results that fall within a particular filter type, such as a date range, name, material, weight, or any other suitable filter type. After the user enters the SPARQL filter to query entry field 82, a SPARQL query that includes the entered filter may be generated.

Query entry field 82 may further allow a user to create a SPARQL query having multiple query statements. For example, after populating a subject, predicate and object for a first SPARQL query statement, the user may actuate the "add phrase" button in the query entry field 82 so as to add additional SPARQL query statements. This may allow a SPARQL query to be generated which includes multiple query statements.

Output window portion 86 provides a user with various options associated with the SPARQL query to be generated. According to the illustrated embodiment, output portion window 86 includes an edit filters tab 86a, query view tab 86b, a graph view tab 86c, a saved queries tab 86d, a select results tab 86e, a construct results tab 86f, and an export query tab 86g.

The edit filters tab 86a allows a user to further edit the SPARQL query. For example, when the edit filters tab 86a is actuated, output window portion 86 may allow a user may modify the entries to be used as the subject, predicate, object, and filter of the SPARQL query. As a further example, when the edit filters tab 86a is actuated, output window portion 86 includes a query type selector 86h. The query type selector 86h allows the user to select the type of SPARQL query to be generated. For example, the user may select any suitable type of SPARQL query, such as a SPARQL "select" query or a SPARQL "construct" query. A SPARQL select query requests results to the query. For example, when a SPARQL select query is generated and transmitted to knowledge store 42, results of that SPARQL select query may be received and displayed to the user at user computer 14 (such as in a tabular format as is illustrated in FIG. 7). On the other hand, a SPARQL construct query may be used to not only request results of the query, but also to produce inferred triples in knowledge store 42. In one embodiment, a rule may refer to any statement that may cause knowledge store 42 to infer and store additional triples. One example of a rule may be that "an entity is vulnerable to a bombing effect if the entity is a facility." In one embodiment, by creating a SPARQL construct query, a user may be able to add data to knowledge store 42.

In one embodiment, the SPARQL construct query may include both a rule head (which includes the triples to be added) and a rule body (which includes the query statements that must be met). For example, consider the rule "an entity is vulnerable to a bombing effect if the entity is a facility." The head provides the triple(s) to be added to knowledge store 42 (the triple "an entity is vulnerable to a bombing effect") and the rule body indicates which triples in knowledge store 42 apply to the rule to (such as indicating that the rule is to apply to triples that include "?entity" as a subject, "is a" as a predicate, and "facility" as an object). In order to create a SPARQL construct query, the user may select a construct query type, enter a head that includes the desired triples to be added (using subject entry field 82a, predicate entry field 82b, and object entry field 82c), and also by entering a rule body subject, predicate, and object (using subject entry field 82a, predicate entry field 82b, and object entry field 82c). In particular embodiments, the drag-and-drop selection technique may be used to add the head and rule body.

Figure 5:
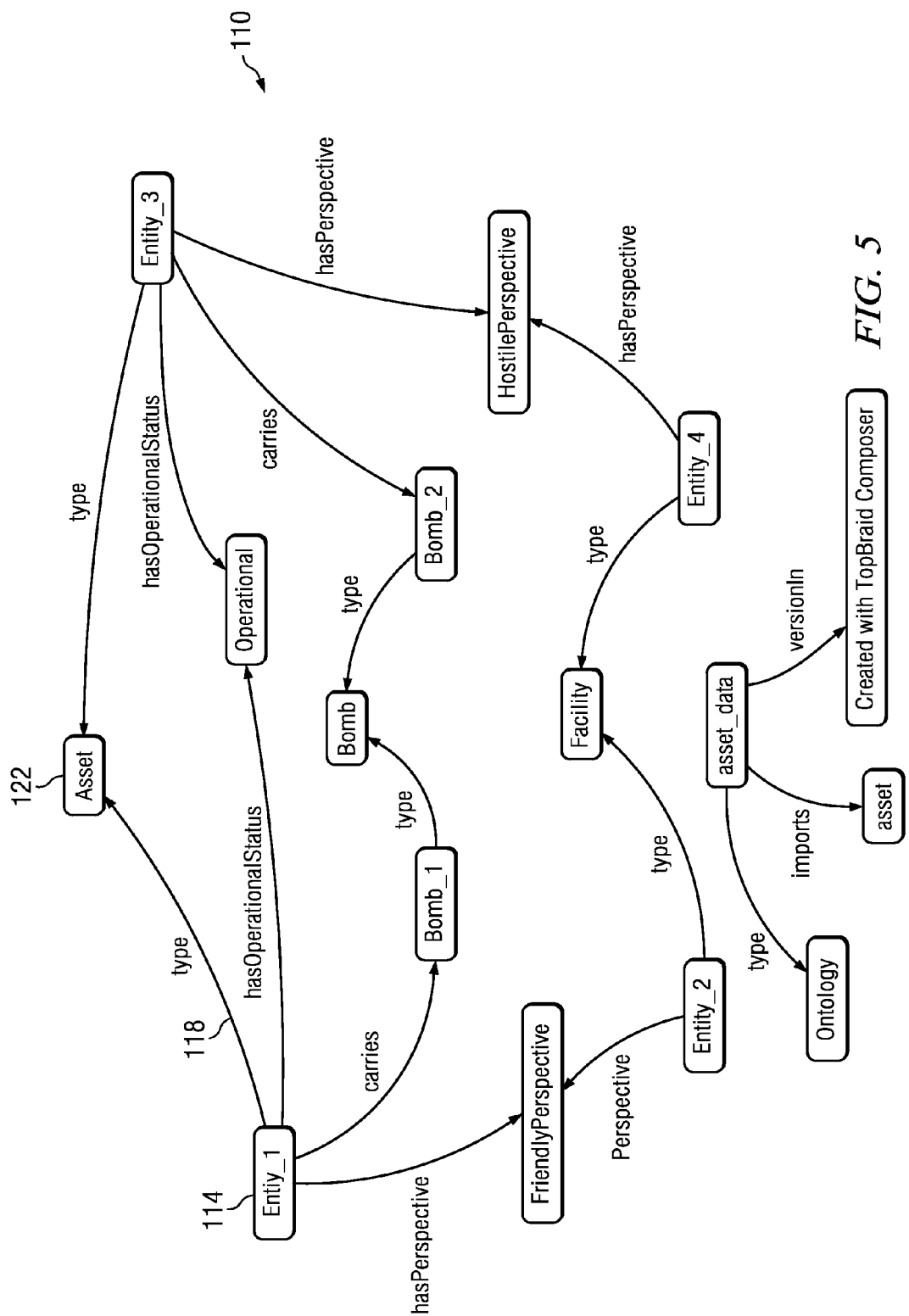
FIG. 5 illustrates one embodiment of the output window portion that may be displayed in response to actuation of the graph view tab.

In one embodiment, not only will the SPARQL construct query add data to knowledge store 42, but the SPARQL construct query may also return results of the SPARQL construct query. For example, after the SPARQL construct query is transmitted to knowledge store 42, output portion window 86 may display the results of the SPARQL construct query in a graph form (as is illustrated in FIG. 5).

Figure 4:
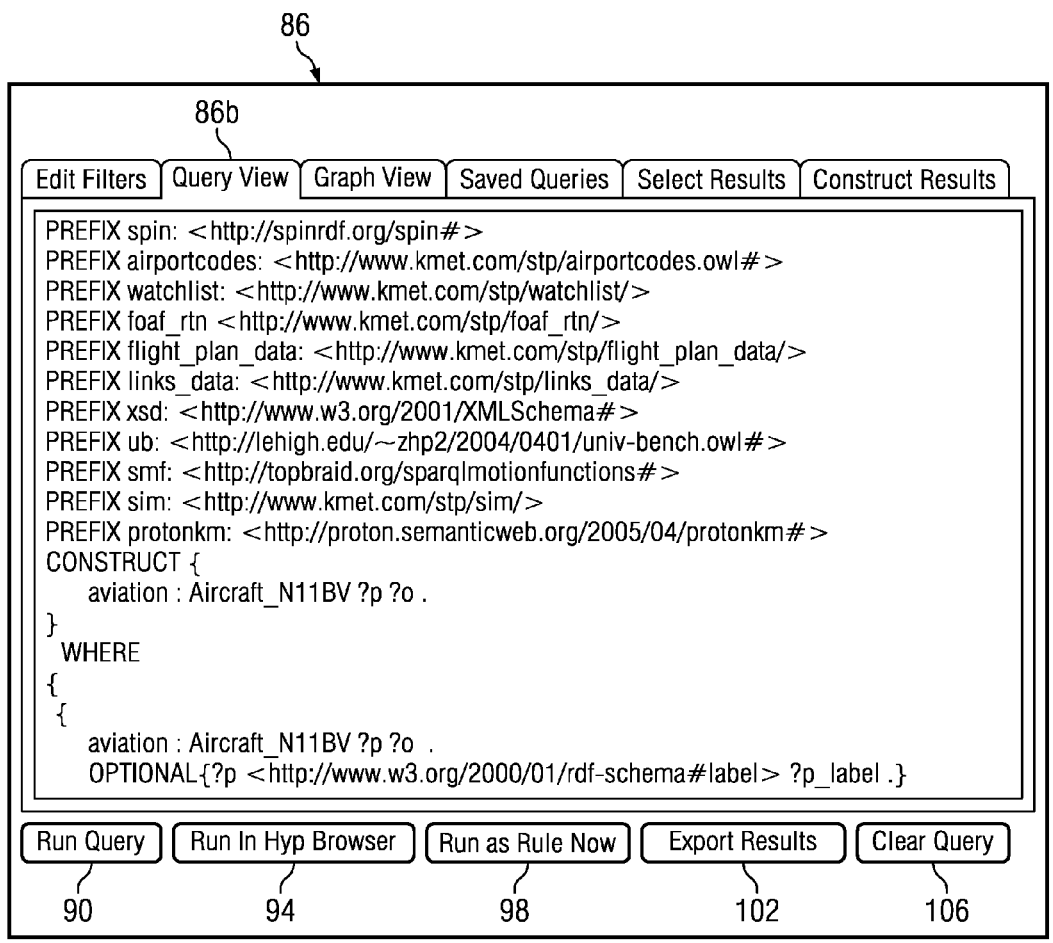
FIG. 4 illustrates one embodiment of the output window portion that may be displayed in response to actuation of the query view tab.

FIG. 4 illustrates one embodiment of the output window portion 40 that may be displayed in response to actuation of the query view tab 86b. In one embodiment, when a user actuates the query view tab 86b, output window portion 86 may display the generated SPARQL query. In one embodiment, this may allow the user to view the generated SPARQL query before performing any other action on the generated SPARQL query. In a further embodiment, this may allow the user to provide further edits to the generated SPARQL query. For example, the user may edit one or more phrases in the generated SPARQL query so as to change the generated SPARQL query.

When the query view tab 86b is actuated, output window portion 86 includes a run query button 90, a run in hyperbolic browser button 94, a run as rule now button 98, an export results button 102, and a clear query button 106. The run query button 90 may be actuated to instruct query builder engine 34 to transmit the generated SPARQL query to knowledge store 42. The run in hyperbolic browser button 94 may be actuated to transmit the generated SPARQL query to knowledge store 18 and receive the results of the generated SPARQL query in a hyperbolic browser (such as a hyperbolic browser implemented in JAVA) so as to display the results in a graph form (as is described in further detail in FIG. 5). The run as rule now button 98 may be actuated to transmit a generated SPARQL query to knowledge store 42 as a SPARQL construct query. As such, the rule may add inferred triples to knowledge store 42. The export results button 102 may be actuated to transmit the generated SPARQL query to knowledge store 42 and export the results of the generated SPARQL query. In one embodiment, exporting the results of the SPARQL query may cause the results to be formatted in any suitable format. For example, the results may be formatted according to an extensible markup language (XML) format, or according to comma separated values (CSV). In other embodiments, the results may be formatted in any other suitable format. The clear query button 106 may be actuated in order to delete the generated SPARQL query.

As is discussed above, the run query button 90, the run in hyperbolic browser button 94, the run as rule now button 98, and the export results button 102 may cause the generated SPARQL query to be transmitted to knowledge store 42 in order to retrieve results of the SPARQL query. In one embodiment, the transmission of the SPARQL query may occur immediately upon selecting to transmit the SPARQL query. In a further embodiment, the transmission of the generated SPARQL query may be scheduled for another time. For example, the transmission of the SPARQL query may be scheduled to occur in an hour, a day, a week, or any other suitable time frame. As a further example, the transmission of the generated SPARQL query may be scheduled to occur at periodic intervals, such as every hour, every week, every month, or any other suitable time frame. As such, the same generated SPARQL query may be run periodically without further input by the user. This may allow the results of the generated SPARQL query to be continuously updated as new data is added to knowledge store 42.

FIG. 5 illustrates one embodiment of the output window portion 86 that may be displayed in response to actuation of the graph view tab 86c. As illustrated, output window portion 86 displays a graph 110. Graph 110 may refer to a graphical representation of the results obtained by running the generated SPARQL query. For example, after the generated SPARQL query is transmitted to knowledge store 42, the results of the SPARQL query may be transmitted to a hyperbolic browser in order to generate graph 110. According to the illustrated embodiment, graph 110 includes node 114, edge 118, and node 122. Node 114 may refer to the subject portion of a triple stored in knowledge store 42. Edge 118 may refer to a predicate portion of the triple stored in knowledge store 42. Node 122 may refer to the object portion of the triple stored in knowledge store 42. In one embodiment, by displaying graph 110, a user may be able to understand the relationships between various triples stored in knowledge store 42.

Although FIG. 5 has been described as displaying graph 110 in output window portion 86, in a further embodiment, graph 110 may be displayed in a different window than output window portion 86. For example, actuation of the graph view tab 86c may cause a new window to open and display graph 110. In particular embodiments, the new window may be associated with a hyperbolic browser. For example, graph 110 may be displayed in the hyperbolic browser.

FIG. 6 illustrates one embodiment of the output window portion 86 that may displayed in response to actuation of the saved queries tab 86d. As illustrated, output window portion 86 may include a list of SPARQL queries that have been previously generated and saved by query building engine 34. In one embodiment, by actuating the saved queries tab 86d, a user may be able to load a previously generated SPARQL query, or delete a previous generated SPARQL query. In a further embodiment, after a SPARQL query has been generated, as is discussed with regard to FIG. 3, the user may be provided with the option to save the generated SPARQL query and name the generated SPARQL query. Upon doing so, the generated SPARQL query may be saved and displayed under the saved queries tab 86d.

FIG. 7 illustrates one embodiment of the output window portion 86 that may be displayed in response to actuation of the select results tab 86e. In one embodiment, by actuating the select results tab 86e, the user may be provided a list of all (or a portion of) the results returned by the SPARQL query in a tabular format. In a further embodiment, under the select results tab 86e, output window portion 86 may allow a user to select one or more of the returned results. In one embodiment, by selecting one or more of the results, a graph (such as is illustrated in FIG. 5) may be generated, such as by a hyperbolic browser. In a further embodiment, the generated graph may include the selected result as a starting node in the graph. As such, the user may be able to walk the graph from this starting node.

FIG. 8 illustrates one embodiment of the output window portion 86 that may be displayed in response to actuation of the construct view tab 86f. As illustrated, when a user actuates the construct results tab 86f, the tabular results returned from a SPARQL select query may be generated as a graph. This may allow the user to view the relationships between triples stored in knowledge store 42.

Figure 9:
FIG. 9 illustrates one embodiment of the output window portion that may be displayed in response to actuation of the export query tab.

FIG. 9 illustrates one embodiment of the output window portion 86 that may be displayed in response to actuation of the export query tab 86g. As illustrated, the generated SPARQL query may be formatted according to an XML format, or according to a CSV via alternative selection of radio buttons 126 and 130. In other embodiments, the generated SPARQL query may be formatted in any other suitable format. In a further embodiment, the user may be able to export the results of the generated SPARQL query by actuating the export button. In such an embodiment, the results of the generated SPARQL query may be displayed in any suitable format, such as XML or CSV.

FIG. 10 illustrates an example portion of a SPARQL query that has been generated by query building engine 42 of FIG. 1.

Figure 11:
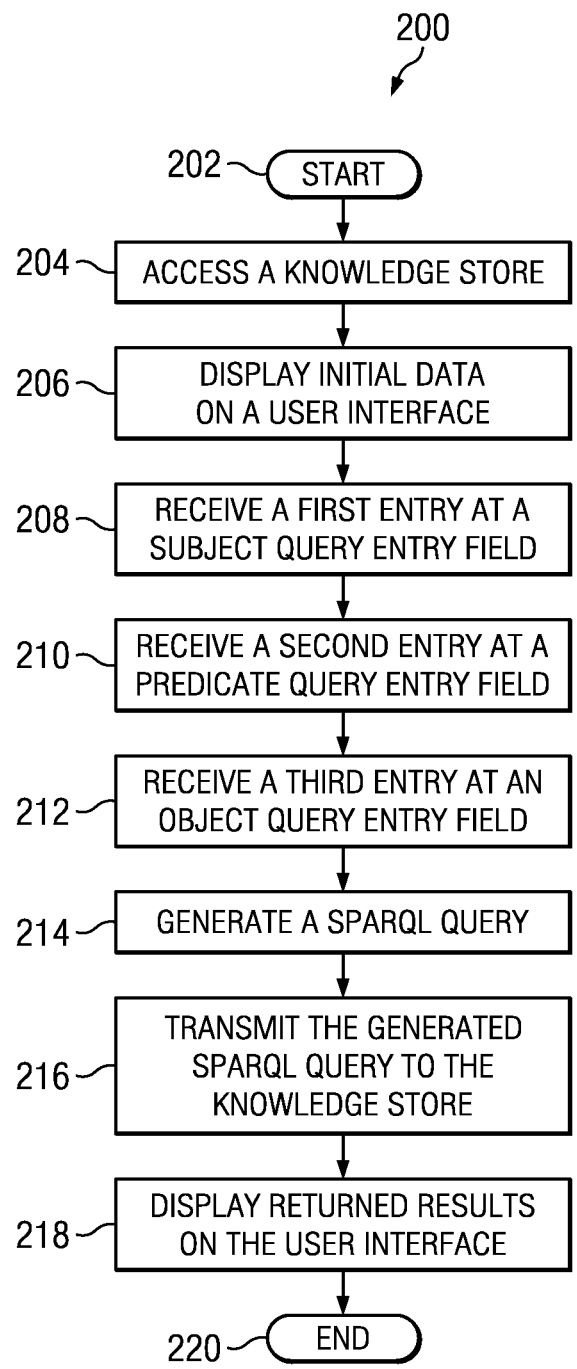
FIG. 11 illustrates one example method for generating a SPARQL query according to certain embodiments of the present disclosure.

FIG. 11 illustrates an example method for generating a SPARQL query according to certain embodiments of the present disclosure. In one embodiment, one or more steps of the method 200 may be performed by query building engine 34 of FIG. 1.

At step 202 the method begins. At step 204 a knowledge store is accessed. The knowledge store (such as knowledge store 42 of FIG. 1) may store records structured according to a RDF specification. Furthermore, each record stored in the knowledge store 42 may include a subject, a predicate, and an object.

At step 206, initial display data is displayed on a user interface. In one embodiment, the initial display data may include any particular combination of a plurality of classes, a plurality of instances, a plurality of predicates, and a plurality of text entries. For example, the initial display data may include only a single class (or instance, or predicate, or text entry), or all of the classes, instances, predicates, and/or text entries. In one embodiment, the user interface displaying the initial display data may be a GUI (such as query building window 66 of FIG. 3). In particular embodiments, displaying the initial display data on the user interface may refer to generating the initial display data to be displayed on a user interface. For example, in one embodiment, the initial display data may be generated by query building engine 34 executed on query building system 22, and the generated initial display data may be communicated to user computer 14 for display to a user on the user interface.

At step 208, a first entry is received at a subject query entry field. In one embodiment, the first entry may be received based on a drag-and-drop selection technique. In one embodiment, the first entry may include a class, an instance, or a text entry.

At step 210, a second entry is received at a predicate query entry field. In one embodiment, the second entry may be received based on a drag-and-drop selection technique. In one embodiment, the second entry may include a predicate or a text entry.

At step 212, a third entry is received at an object query entry field. In one embodiment, the third entry may be received based on a drag-and-drop selection technique. In one embodiment, the third entry may include a class, an instance, or a text entry. In particular embodiments, steps 208-212 may be repeated in order to generate additional query statements.

At step 214, a SPARQL query is generated. In one embodiment, the SPARQL query may be generated in any suitable manner. For example, the SPARQL query may be generated using one or more of the first entry, the second entry, and the third entry. In a further embodiment, the SPARQL query may be generated using SPARQL statement data stored in memory. For example, each of the classes, instances, predicates, and text entries may be associated with SPARQL statement data that includes any data necessary to create a SPARQL query based on the classes, instances, predicates, and/or text entries.

In one embodiment, prior to the SPARQL query being generated, one or more edits to the first entry, second entry, and/or third entry may be received from a user. For example, a user may type in one or more edits to the entries. As such, the SPARQL query may be generated with the edits. In a further embodiment, prior to the generation of the SPARQL query, a rule may be received. In one embodiment, a rule may refer to any suitable rule that may cause a knowledge store to add data for storage. For example, the rule may cause the knowledge store infer additional records (such as additional inferred triples). In one embodiment, by adding the rule, the SPARQL query may be generated as a SPARQL construct query configured to cause the knowledge store to add the inferred records due to the firing of the rule to the knowledge store. In a further embodiment, after the SPARQL query is generated, one or more edits to the generated SPARQL query may be received. For example, a user may type in one or more edits to the SPARQL query. As such, the generated SPARQL query may be changed prior to being transmitted to the knowledge store.

At step 216, the generated SPARQL query is transmitted to the knowledge store. In one embodiment, the generated SPARQL query may be transmitted over a network to the knowledge store. In one embodiment, the generated SPARQL query may be transmitted using any suitable protocol.

At step 218, return results are displayed on the user interface. In one embodiment, the return results may be the results of the transmitted SPARQL query. In one embodiment, the return results may be displayed in a tabular format. In a further embodiment, the return results may be displayed in a graphical format, such as by a hyperbolic browser. In a further embodiment, displaying the return results on the user interface may refer to generating return results data for display on the user interface. For example, in one embodiment, the return results data may be generated by query building engine 34 executed on query building system 22, and the generated return results data may be communicated to user computer 14 for display to a user on the user interface.

In one embodiment, after the return results are displayed, the method may further include receiving a selection of one of the return results. Based on this selection, the method may further include displaying one or more of the return results as a graph, such as in a hyperbolic browser. In such an embodiment, the graph may include the selected result as a starting node in the graph. At step 220, the method ends.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

To aid the Patent Office and any readers of any patent issued on this application and interpreting the claims appended hereto, Applicants wish to note that they do not intend any of the appended claims to invoke Paragraph 6 of 35 U.S.C. §112 as it exists on the date of filing hereof unless "means for" or "step for" are used in the particular claim.

What is claimed is:

1. A computer-implemented method, comprising;
    accessing, by a computer system, a knowledge store that stores records structured according to a Resource Description Framework (RDF) specification;
    based on a drag-and-drop selection technique, receiving a first entry in a first query entry field, the first entry selected from a group comprising one or more of the following: a first class of a plurality of classes, a first predicate of a plurality of predicates, a first instance of a plurality of instances, and a first text entry of a plurality of text entries;
    generating a SPARQL Protocol and RDF Query Language (SPARQL) query using at least the first entry;
    transmitting the generated SPARQL query to the knowledge store;
    displaying returned results of the transmitted SPARQL query;
    receiving a selection of one result of the returned results; and
    based on the selection of the one result, displaying one or more of the returned results as a graph in a hyperbolic browser, wherein the graph includes the one result as a starting node in the graph.

2. The computer-implemented method of claim 1, wherein the first query entry field is selected from a group comprising one or more of the following: a subject query entry field, a predicate query entry field, and an object query entry field.

3. The computer-implemented method of claim 1, wherein:
    the first query entry field comprises a subject query entry field;
    the first entry comprises one of the first class, the first instance, and the first text entry;
    the method further comprises:
        based on the drag-and-drop selection technique, receiving a second entry in a predicate query entry field, the second entry selected from a group comprising one or more of the following: the first predicate and a second text entry of the plurality of text entries; and
        based on the drag-and-drop selection technique, receiving a third entry in an object query entry field, the third entry selected from a group comprising one or more of the following: a second class of the plurality of classes, a second instance of the plurality of instances, and a third text entry of the plurality of text entries; and
    generating the SPARQL query using at least the first entry comprises generating the SPARQL query using at least the first entry, the second entry, and the third entry.

4. The computer-implemented method of claim 1, wherein:
    the method further comprises receiving a rule configured to add additional records to the knowledge store;
    generating the SPARQL query using at least the first entry comprises generating the SPARQL query using at least the first entry and the rule; and
    the generated SPARQL query comprises a SPARQL construct query configured to cause the knowledge store to add the additional records to the knowledge store.

5. The computer-implemented method of claim 1, further comprising receiving one or more edits to the generated SPARQL query.

6. The computer-implemented method of claim 1, wherein the drag-and-drop selection technique comprises:
  selecting a selectable entry displayed in a first portion of a user interface;
  dragging the selected entry to a second portion of the user interface; and
  dropping the selected entry into the second portion of the user interface.

7. A computer system comprising:
  one or more memory units;
  one or more processing units operable to execute a knowledge store query engine stored on the computer system, the knowledge store query engine operable when executed to:
  access a knowledge store that stores records structured according to a Resource Description Framework (RDF) specification;
  based on a drag-and-drop selection technique, receive a first entry in a first query entry field, the first entry selected from a group comprising one or more of the following: a first class of a plurality of classes, a first predicate of a plurality of predicates, a first instance of a plurality of instances, and a first text entry of a plurality of text entries;
  generate a SPARQL Protocol and RDF Query Language (SPARQL) query using at least the first entry;
  transmit the generated SPARQL query to the knowledge store;
  display returned results of the transmitted SPARQL query;
  receive a selection of one result of the returned results; and
  based on the selection of the one result, display one or more of the returned results as a graph in a hyperbolic browser, wherein the graph includes the one result as a starting node in the graph.

8. The computer system of claim 7, wherein the first query entry field is selected from a group comprising one or more of the following: a subject query entry field, a predicate query entry field, and an object query entry field.

9. The computer system of claim 7, wherein:
  the first query entry field comprises a subject query entry field;
  the first entry comprises one of the first class, the first instance, and the first text entry;
  the knowledge store query engine is further operable when executed to:
    based on the drag-and-drop selection technique, receive a second entry in a predicate query entry field, the second entry selected from a group comprising one or more of the following: the first predicate and a second text entry of the plurality of text entries; and
    based on the drag-and-drop selection technique, receive a third entry in an object query entry field, the third entry selected from a group comprising one or more of the following: a second class of the plurality of classes, a second instance of the plurality of instances, and a third text entry of the plurality of text entries; and
  the knowledge store query engine operable when executed to generate the SPARQL query using at least the first entry comprises the knowledge store query engine operable when executed to generate the SPARQL query using at least the first entry, the second entry, and the third entry.

10. The computer system of claim 7, wherein:
  the knowledge store query engine is further operable when executed to receive a rule configured to add additional records to the knowledge store;
  the knowledge store query engine operable when executed to generate the SPARQL query using at least the first entry comprises the knowledge store query engine operable when executed to generate the SPARQL query using at least the first entry and the rule; and
  the generated SPARQL query comprises a SPARQL construct query configured to cause the knowledge store to add the additional records to the knowledge store.

11. The computer system of claim 7, wherein the knowledge store query engine is further operable when executed to receive one or more edits to the generated SPARQL query.

12. The computer system of claim 7, wherein the drag-and-drop selection technique comprises:
  selecting a selectable entry displayed in a first portion of a user interface;
  dragging the selected entry to a second portion of the user interface; and
  dropping the selected entry into the second portion of the user interface.

13. A non-transitory computer-readable medium comprising logic, the logic when executed by one or more processing units operable to perform operations comprising:
  accessing a knowledge store that stores records structured according to a Resource Description Framework (RDF) specification;
  based on a drag-and-drop selection technique, receiving a first entry in a first query entry field, the first entry selected from a group comprising one or more of the following: a first class of a plurality of classes, a first predicate of a plurality of predicates, a first instance of a plurality of instances, and a first text entry of a plurality of text entries;
  generating a SPARQL Protocol and RDF Query Language (SPARQL) query using at least the first entry;
  transmitting the generated SPARQL query to the knowledge store;
  displaying returned results of the transmitted SPARQL query;
  receiving a selection of one result of the returned results; and
  based on the selection of the one result, displaying one or more of the returned results as a graph in a hyperbolic browser, wherein the graph includes the one result as a starting node in the graph.

14. The non-transitory computer-readable medium of claim 13, wherein the first query entry field is selected from a group comprising one or more of the following: a subject query entry field, a predicate query entry field, and an object query entry field.

15. The non-transitory computer-readable medium of claim 13, wherein:
  the first query entry field comprises a subject query entry field;
  the first entry comprises one of the first class, the first instance, and the first text entry;
  the logic when executed by the one or more processing units is further operable to perform operations comprising:
    based on the drag-and-drop selection technique, receiving a second entry in a predicate query entry field, the second entry selected from a group comprising one or more of the following: the first predicate and a second text entry of the plurality of text entries; and based on the drag-and-drop selection technique, receiving a third entry in an object query entry field, the third entry selected from a group comprising one or more of the following: a second class of the plurality of classes, a second instance of the plurality of instances, and a third text entry of the plurality of text entries; and the logic when executed by the one or more processing units operable to perform operations comprising generating the SPARQL query using at least the first entry comprises the logic when executed by the one or more processing units further operable to perform operations comprising generating the SPARQL query using at least the first entry, the second entry, and the third entry.

16. The non-transitory computer-readable medium of claim 13, wherein:
the logic when executed by the one or more processing units is further operable to perform operations comprising receiving a rule configured to add additional records to the knowledge store;
the logic when executed by the one or more processing units operable to perform operations comprising generating the SPARQL query using at least the first entry comprises the logic when executed by the one or more processing units further operable to perform operations comprising generating the SPARQL query using at least the first entry and the rule; and
the generated SPARQL query comprises a SPARQL construct query configured to cause the knowledge store to add the additional records to the knowledge store.

17. The non-transitory computer-readable medium of claim 13, wherein the logic when executed by the one or more processing units is further operable to perform operations comprising receiving one or more edits to the generated SPARQL query.

18. The non-transitory computer-readable medium of claim 13, wherein the drag-and-drop selection technique comprises:
selecting a selectable entry displayed in a first portion of a user interface;
dragging the selected entry to a second portion of the user interface; and
dropping the selected entry into the second portion of the user interface.

* * * * *

UNITED STATES PATENT AND TRADEMARK OFFICE
CERTIFICATE OF CORRECTION

PATENT NO. : 8,984,002 B2
APPLICATION NO. : 13/100079
DATED : March 17, 2015
INVENTOR(S) : Moon et al.

Page 1 of 1

It is certified that error appears in the above-identified patent and that said Letters Patent is hereby corrected as shown below:

Specification

In column 7, line 26, delete "22" and insert --46--, therefor

In column 10, line 16, delete "40" and insert --86--, therefor

In column 12, line 11, delete "42" and insert --34--, therefor

Claims

In column 14, line 11, in Claim 1, delete "comprising;" and insert --comprising:--, therefor In column 18, line 3, in Claim 16, delete "SPA RQL" and insert --SPARQL--, therefor Signed and Sealed this
Twenty-fourth Day of May, 2016

Michelle K. Lee
*Director of the United States Patent and Trademark Office*